United States Patent
Balloni et al.

(10) Patent No.: US 6,329,048 B1
(45) Date of Patent: Dec. 11, 2001

(54) MULTI-LAYER BARRIER FILM

(75) Inventors: Riccardo Balloni; Michael T. Heffelfinger, both of Fairport; Mark W. Lockhart, E. Rochester; Robert G. Peet, Pittsford; Eileen A. Stetter, Fairport, all of NY (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 08/234,516

(22) Filed: Apr. 28, 1994

Related U.S. Application Data

(63) Continuation of application No. 07/947,231, filed on Sep. 18, 1992, now abandoned.

(51) Int. Cl.$^7$ .................................................. B32B 15/04
(52) U.S. Cl. ......................... 428/349; 428/516; 524/300
(58) Field of Search .............................. 428/349, 516, 428/910, 216, 447, 448; 524/300

(56) References Cited

U.S. PATENT DOCUMENTS

| | | | |
|---|---|---|---|
| 3,278,646 | 10/1966 | Lambert, Jr. | 260/897 |
| 4,230,767 * | 10/1980 | Isaka | 428/516 |
| 4,293,608 | 10/1981 | Isaka et al. | 428/220 |
| 4,911,976 | 3/1990 | Park et al. | 428/216 |
| 4,921,749 | 5/1990 | Bossaert et al. | 428/216 |
| 5,085,943 | 2/1992 | Crighton et al. | 428/500 |
| 5,087,667 * | 2/1992 | Hwo | 428/516 |
| 5,089,319 * | 2/1992 | Bothe | 428/448 |
| 5,128,183 | 7/1992 | Buzio | 428/35.7 |
| 5,151,317 * | 9/1992 | Bothe | 428/516 |
| 5,178,960 | 1/1993 | Cook | 428/461 |
| 5,194,474 * | 3/1993 | Aoyama | 524/300 |

FOREIGN PATENT DOCUMENTS

308212 * 10/1986 (JP) ..................................... 428/516

* cited by examiner

*Primary Examiner*—William Krynski
(74) *Attorney, Agent, or Firm*—T. Dean Simmons

(57) ABSTRACT

A product capable of absorbing unwanted odors and unpleasant flavors, is sealed from said odors and flavors by being sealingly overwrapped with a film comprising an oriented film of a blend of polypropylene and a polymerized polyterpene selected from the group consisting of polymerized d-limonene, polymerized beta-pinene, polymerized synthetic approximation of d-limonene and beta-pinene and mixtures thereof.

6 Claims, No Drawings

MULTI-LAYER BARRIER FILM

This is continuation of application Ser. No. 07/947,231, filed on Sep. 18, 1992, now abandoned.

FIELD OF THE INVENTION

The present invention is concerned with the overwrapping of products which can be adversely affected from a quality standpoint with the infusion of unwanted odors and unwanted flavors or by the loss of characteristic, desired aromas and flavors.

BACKGROUND OF THE INVENTION

A constant problem in the packaging of commercial products, particularly those for human consumption, is how to protect the integrity of these products so that their desired flavor and aroma are not lost and unwanted odors and unpleasant flavors are not permitted to be transmitted into the product.

It is an object of the present invention to provide a packaging film material which retains the integrity of the flavor and aroma of a packaged product and excludes unwanted odors and flavors from being transmitted to the product.

It is another object of the present invention to provide a method for preventing the transmission of odors and flavors into or out of such a package.

SUMMARY OF THE INVENTION

The present invention relates to the packaging of a product capable of absorbing unwanted odors and unpleasant flavors, or a product containing desirable flavor and aroma characteristics, that are to be retained. The package employs an oriented film of a blend of polypropylene and a member selected from the group consisting of polymerized d-limonene, polymerized beta-pinene, or a polymerized synthetic approximation of d-limonene and beta-pinene and mixtures thereof, to exclude unwanted odors or flavors and to retain those that are desirable. The present invention is also concerned with a method for preventing the transmission of odors and flavors into or out of a product, when the product is packaged in an oriented film of a blend of polypropylene and a member selected from the group consisting of polymerized d-limonene, polymerized beta-pinene, a polymerized synthetic approximation of d-limonene and beta-pinene and mixtures thereof.

It is preferred that the film structures identified above include a heat-sealable skin layer comprising a polyolefin of comparatively low stereoregularity on at least one surface thereof.

DETAILED DESCRIPTION OF THE INVENTION

The present invention is broadly directed to the improvement in the flavor or aroma barrier properties of polypropylene films. It has been discovered that the admixture of certain polyterpenes identified above, into polypropylene polymers will effectively block the transmission of flavors and odors through polypropylene polymer blend while other polyterpene admixtures are comparatively ineffective. An example of a polymerized polyterpene which has given ineffective results is polymerized alpha-pinene.

This is a surprising result in the face of past general teachings regarding the moisture barrier and gas barrier benefits that can arise from the use of the broad general class of polyterpenes and their blends with polypropylene.

Past disclosures have taught improvements in gas barrier characteristics, which pertain to the minimization of non-condensible gases; such as oxygen, nitrogen, and carbon dioxide, through the film. These are useful in such applications as gas flushing with nitrogen or carbon dioxide to protect the product inside a package from oxidizing and becoming stale.

Past disclosures have also taught improvements in moisture barrier which pertain to the migration of water and water vapor through the film. These are useful in the packaging of dry foods, such as crackers and potato chips, to maintain texture, etc.

What we have discovered is that application to pungent, aromatic oils is not encompassed in the past teaching. We have discovered a comparative few compounds which are effective in reducing the migration of aromatic oils when used in an admixture with polypropylene polymers. Oriented films made from these blends of polymers effectively prevent, for example, cigarette packages that are sold in gasoline station displays from picking up hydrocarbon odors, lemon-flavored cookies from losing their fresh-baked, lemon flavor and scent, etc. Oriented films with good moisture barrier and good gas barrier have not met these needs.

The base film of the present odor and flavor barrier structure is comprised of a combination of a homopolymer polypropylene, which is of comparatively high stereoregularity having a melting point range of from about 321°–333° F., interblended with from about 1 to about 20% by weight of the above identified polyterpene. A preferred range is from about 10 to 15% by weight of the added polyterpene. The basic structure of the aroma and flavor barrier film can be the same or similar to that described in U.S. Pat. No. 4,911,976 the disclosure of which is incorporated herein by reference in its entirety. In this patent the oriented multi-layer film structure comprises coextruded layers of (a) a base layer comprising polypropylene of comparatively high stereo regularity and (b) a heat-sealable skin layer comprising a polyolefin of comparatively low stereo regularity on at least one surface of (a). The skin layers can contain a slip additive and/or an antiblock material chosen from those suitable for such products. The skin layer can range from about 0.5–5 microns. The preferred polypropylenes for the base layer are formed by polymerizing propylene in the presence of a stereo specific catalyst system. They can have a melt flow rate, measured by the ASTM-1238 technique, ranging from about 1 to about 25, preferably 2–4. The crystalline melting point is about 321°–333° F. The average molecular weight range is from about 25,000 to about 100,000. The density is from 0.90 to 0.92.

The comparatively low stereo regular polyolefin polymers contemplated as the skin materials of the multilayer system include, for example, ethylene-propylene-butene-1 terpolymers. Preferred terpolymers are ethylene-propylene-butene-1 terpolymers having 1–5 wt % ethylene and 1–15 wt % butene-1. The preferred polyterpenes have a molecular weight of from about 800 to about 15,000 $M_n$.

The multi-layer films of the present invention can be prepared employing commercially available systems for coextruding resins. The polypropylene homopolymer of comparatively high stereo regularity blended with the selected polyterpene can be coextruded with an ethylene-propylene-butene-1 terpolymer. The polymers can be brought to the molten state and coextruded from a conventional extruder through a flat sheet die, the melt streams being combined in an adapter prior to being extruded from the die. After leaving the die orifice, the multi-layer film structure is chilled and the quenched sheet then reheated and stretched, e.g., 4–6 times in the machine direction (MD), and subsequently, for example, 4–12 times in the transverse direction (TD). The edges of the film can be trimmed and the film wound onto a core. The following examples will illustrate the invention.

EXAMPLE 1

A polypropylene homopolymer of comparatively high stereo regularity, i.e., Exxon PLTD745, was melt-blended with 15% by weight of Piccolyte C115 obtainable from Hercules Corporation. This material comprises polymerized d-limonene. This blend was coextruded with Sumitomo WS 709N which is an ethylene-propylene-butene-1 terpolymer containing 14% by weight butene-1 and 1.5% ethylene. This combination was coextruded and oriented so as to have outer skin layer dimensions of 0.6 micron and a core layer dimension of 20 microns. In order to test the effectiveness of this film in excluding deleterious odors and flavors from a package susceptible of absorbing such flavors, several packages of cigarettes were wrapped and sealed in the film. All the cigarette packages were placed in a controlled environment which exposed them to an aromatic hydrocarbon that provides a typical or potential odorant that can be readily identified chemically and measured quantitatively. In this case the aromatic hydrocarbon was toluene. Individual cigarette packs were withdrawn from the controlled environment in a time sequence. A small air space sample was then taken from within the package with a hypodermic syringe. This sample was analyzed chromatographically. The chromatographic peak stayed relatively low as time progressed and raised only slowly at longer times. The test was carried out over a time period of from 0–200 hours. This showed that polymerized d-limonene is an excellent odor barrier when mixed with polypropylene.

EXAMPLE 2

The technique of Example 1 was repeated except that polymerized beta-pinene was employed as the effective odor and flavor barrier material blended with the polypropylene. The same excellent results as shown above were obtained upon testing several packages of cigarettes wrapped with the film of this example.

EXAMPLE 3

In this example, polymerized alpha-pinene was employed as the material blended with the polypropylene. Film samples were made in the same manner as in Example 1. Several packages of cigarettes were wrapped and sealed as indicated above and subjected to the same time exposure to toluene. A dramatic increase in the amount of toluene transported through the film wrapper was noted after approximately 100 hrs. of exposure. The level was about three to four times higher than observed when polymerized beta-pinene was employed as the effective barrier agent blended with the polypropylene. This indicates that the polymerized alpha-pinene is an ineffective odor barrier material.

A synthetic combination of polymerized d-limonene and polymerized beta-pinene obtainable from Hercules as PS676 is also an effective odor and flavor barrier and can be used in the same manner as the polymerized d-limonene and beta-pinene.

Over 60% of the natural and synthetic polyterpenes tested in blends with polypropylene had little or no effect on aroma barrier.

As various changes can be made in the above method and structure without departing from the scope of the invention, it is intended that all matter contained in the above description shall be interpreted as illustrative and not in a limiting since.

What is claimed is:

1. In a method for preventing the transmission of odors and unpleasant flavors to a product comprising sealing said product in an oriented film, the improvement comprising an oriented film of a blend of polypropylene and a polymerized polyterpene selected from the group consisting of polymerized d-limonene, polymerized beta-pinene, and mixtures thereof, said polyterpene being present in an amount sufficient to act as an effective odor an flavor barrier when blended with polypropylene wherein said polymerized polyterpene is present with said polypropylene in a percent weight ranging from about 1% to about 20% by weight.

2. The method of claim 1, wherein said film includes a heat sealable skin layer comprising a polyolefin on at least one surface thereof 3. The method of claim 1, wherein said polymerized polyterpene is polymerized d-limonene.

4. The method of claim 1, wherein said polymerized polyterpene is beta-pinene.

5. The method of claim 1, wherein said polymerized polyterpene is a mixture of polymerized d-limonene and beta-pinene.

6. A method comprising sealing a product in an oriented film of a blend of polypropylene and a polymerized polyterpene selected from the group consisting of polymerized d-limonene, polymerized beta-pinene, and mixtures thereof, said polyterpene being present in an amount of from about 1 to about 20% by weight.

* * * * *